(12) United States Patent
Geng et al.

(10) Patent No.: US 12,262,238 B2
(45) Date of Patent: *Mar. 25, 2025

(54) COMMUNICATION METHOD AND DEVICE (71) Applicant: Huawei Technologies Co., Ltd., Shenzhen (CN)

(72) Inventors: Tingting Geng, Shanghai (CN); Hongping Zhang, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,105

(22) Filed: Jan. 26, 2023

(65) Prior Publication Data

US 2023/0171635 A1 Jun. 1, 2023

Related U.S. Application Data

(63) Continuation of application No. 17/147,218, filed on Jan. 12, 2021, now abandoned, which is a (Continued)

(30) Foreign Application Priority Data

Mar. 24, 2017 (CN) .......................... 201710184879.3

(51) Int. Cl.
*H04W 24/10* (2009.01)
*H04W 16/28* (2009.01)

(52) U.S. Cl.
CPC ........... *H04W 24/10* (2013.01); *H04W 16/28* (2013.01)

(58) Field of Classification Search
CPC ... H04W 72/046; H04W 16/28; H04W 24/10; H04W 36/00837; H04W 72/082;
(Continued)

(56) References Cited

U.S. PATENT DOCUMENTS 8,897,254 B2 11/2014 Koivisto et al.
11,265,899 B2 3/2022 Xu et al.
(Continued)

FOREIGN PATENT DOCUMENTS

CN 103716081 A 4/2014
CN 104796185 A 7/2015
(Continued)

OTHER PUBLICATIONS

Huawei et al., "Discussion on link recovery procedure for beam blockage", 3GPP TSG RAN WG1 NR Ad Hoc Meeting R1-1700041, Jan. 16-20, 2017, 6 pages, Spokane, USA.
(Continued)

*Primary Examiner* — Awet Haile
(74) *Attorney, Agent, or Firm* — Slater Matsil, LLP (57) ABSTRACT

Embodiments of this application relate to the field of communications technologies and disclose a communication method and a device. The method includes: determining an offset based on a first quantity, wherein the first quantity is a quantity of beams that are used to determine signal quality of a first cell; and determining the signal quality of the first cell based on the offset.

20 Claims, 7 Drawing Sheets

Related U.S. Application Data continuation of application No. 16/568,845, filed on Sep. 12, 2019, now Pat. No. 10,939,317, which is a continuation of application No. PCT/CN2018/080382, filed on Mar. 24, 2018.

(58) Field of Classification Search
CPC ..... H04W 76/10; H04B 7/088; H04B 7/0695; H04B 7/0413; H04B 7/0421; H04B 7/0632; H04B 7/08; H04B 17/309; H04B 7/04; H04B 7/0626; H04L 43/08; H04L 5/0057

See application file for complete search history.

(56) References Cited

U.S. PATENT DOCUMENTS

| | | | |
|---|---|---|---|
| 2012/0052828 A1 | 3/2012 | Kamel et al. | |
| 2013/0235742 A1* | 9/2013 | Josiam | H04W 24/10 370/252 |
| 2013/0258885 A1 | 10/2013 | Yu et al. | |
| 2014/0177607 A1 | 6/2014 | Li et al. | |
| 2015/0236413 A1 | 8/2015 | Turpin et al. | |
| 2016/0150435 A1 | 5/2016 | Baek et al. | |
| 2016/0197659 A1 | 7/2016 | Yu et al. | |
| 2016/0338033 A1 | 11/2016 | Xiao et al. | |
| 2016/0373180 A1 | 12/2016 | Guo et al. | |
| 2017/0034730 A1 | 2/2017 | Zhang et al. | |
| 2018/0007573 A1* | 1/2018 | Tran | H04W 16/28 |
| 2018/0132158 A1 | 5/2018 | Tseng et al. | |
| 2018/0206170 A1* | 7/2018 | Nagaraja | H04W 16/28 |
| 2019/0174346 A1 | 6/2019 | Murray et al. | |
| 2019/0200249 A1 | 6/2019 | Yoon et al. | |
| 2019/0222291 A1* | 7/2019 | Wang | H04W 36/0085 |
| 2019/0268782 A1* | 8/2019 | Martin | H04W 36/0094 |
| 2020/0014474 A1* | 1/2020 | Khirallah | H04B 7/0695 |
| 2020/0084678 A1* | 3/2020 | Gunnarsson | H04W 36/00837 |

FOREIGN PATENT DOCUMENTS

| | | |
|---|---|---|
| CN | 105933048 A | 9/2016 |
| CN | 106160817 A | 11/2016 |
| CN | 106465378 A | 2/2017 |
| JP | 2017050758 A | 3/2017 |
| KR | 20130103449 A | 9/2013 |
| KR | 20140016854 A | 2/2014 |
| KR | 20140034509 A | 3/2014 |
| RU | 2538735 C2 | 1/2015 |
| WO | 2016179804 A1 | 11/2016 |
| WO | 2017000834 A1 | 1/2017 |
| WO | 2017026455 A1 | 2/2017 |
| WO | 2017045694 A1 | 3/2017 |

OTHER PUBLICATIONS

Sony, "Cell Quality Measurements for DL Mobility," 3GPP TSG RAN WG1 NR Adhoc, R1-1700671, Spokane, USA, Jan. 16-20, 2017, 5 pages.

Samsung, "Discussion on Beam Measurement for 5G New Radio Interface in mmWave Frequency Bands," 3GPP TSG RAN WG2 #94, R2-163652, Nanjing, China, May 23-27, 2016, 4 pages.

Huawei, HiSilicon, Measurement and Mobility in high frequency, 3GPP TSG-RAN2 Meeting #Adhoc , R2-1700166, Jan. 17-19, 2017, 5 pages, Spokane, Washington, USA.

CMCC, "How to derive a cell quality f or RRM measurement", 3GPP TSG-RAN WG2 NR Ad Hoc, R2-1700312, Spokane, WA, USA, Jan. 17-19, 2017, 5 pages.

Huawei, HiSilicon, "Idle mode mobility in NR", 3GPP TSG-RAN2 Meeting#97, R2-1701802, Revision of R2-1700183, Feb. 13-17, 2017, 4 pages, Athens, Greece.

"CSI Reporting for Class B FD-MIMO Schemes," Source: Alcatel-Lucent, Alcatel-Lucent Shanghai Bell, Agenda Item: 6.2.4.3.2, Document for: Discussion/Decision, 3GPP TSG RAN WG1 Meeting #83, R1-156718, Anaheim, US, Nov. 15-22, 2015, 5 pages.

"Discussion multi-TRP operation considering analog beamforming," Agenda Item: 7.1.2.4, Source: LG Electronics, Document for: Discussion and decision, 3GPP TSG RAN WG1 Meeting #87, R1-1611793, Reno, USA Nov. 14-18, 2016, 6 pages.

* cited by examiner

FIG. 1

S201: A terminal determines that information about a first beam group, which meets a condition for reporting a measurement report, in a first cell is different from information about beams in the first cell that is included in a previous measurement report S202: The terminal sends a first measurement report to a network device

COMMUNICATION METHOD AND DEVICE

CROSS-REFERENCE TO RELATED APPLICATIONS

This application is a continuation of U.S. patent application Ser. No. 17/147,218, filed on Jan. 12, 2021, which is a continuation of U.S. patent application Ser. No. 16/568,845, filed on Sep. 12, 2019, now U.S. Pat. No. 10,939,317, which is a continuation of International Application No. PCT/CN2018/080382, filed on Mar. 24, 2018. The International Application claims priority to Chinese Patent Application No. 201710184879.3, filed on Mar. 24, 2017. All of the afore-mentioned patent applications are hereby incorporated by reference in their entireties.

TECHNICAL FIELD

This application relates to the field of communications technologies, and in particular, to a communication method and a device.

BACKGROUND

As mobile communications technologies develop towards aspects such as high speeds and large data service amounts, spectrum demand during communication transmission is increasing. A spectrum in a high frequency band, including a centimeter wave and a millimeter wave, has a large amount of available bandwidth, and therefore becomes an important resource to meet requirements on a large capacity and high bandwidth in future communications.

The significant development of the mobile communications technologies is accompanied with increasing user requirements. When a user requires a larger capacity, sending and receiving of data with higher quality and a multiple-antenna technology have attracted more attention, and therefore beamforming emerges.

Currently, a solution is urgently needed to meet a requirement for reporting a measurement report in a timely manner when a coverage area of a beam is small and a terminal is moving.

SUMMARY

Embodiments of this application provide a communication method and a related device. A terminal may report information about a beam that meets a condition to a base station in a timely manner, so that the terminal can be handed over, in a timely manner, to the beam that meets the condition, avoiding service interruption of the terminal.

According to a first aspect, this application provides a communication method, where the method includes the following. A terminal determines that information about a first beam group, which meets a condition for reporting a measurement report, in a first cell is different from information about beams in the first cell that is included in a previous measurement report.

The terminal sends a first measurement report to a network device, where the first measurement report includes identification information of beams in the first beam group and signal quality of the beams in the first beam group, or the first measurement report includes a quantity of beams in the first beam group, or the first measurement report includes identification information of beams in the first beam group.

In a possible design, that a terminal determines that information about a first beam group, which meets a condition for reporting a measurement report, in a first cell is different from information about beams in the first cell that is included in a previous measurement report may mean that: the terminal determines that the identification information of the beams in the first beam group, which meets the condition for reporting a measurement report, in the first cell is different from identification information of the beams in the first cell that is included in the previous measurement report; and/or the terminal determines that the quantity of the beams in the first beam group, which meets the condition for reporting a measurement report, in the first cell is different from a quantity of beams in the first cell that is included in the previous measurement report.

The identification information of the beam includes at least one of: beam identifier, antenna port identifier of beam, a reference signal of a beam, and beam index.

The condition for reporting a measurement report includes a reporting parameter related to a quantity of beams that are used to determine signal quality of the first cell, where the reporting parameter includes at least one of a signal quality threshold, hysteresis, time to trigger, and an offset for reporting.

By implementing this embodiment of this application, when the terminal obtains through measurement that information about a beam that meets the condition for reporting a measurement report is different from information about a beam in the previous measurement report, the terminal may report the measured information about the beam to the network device, so that the terminal is handed over, in a timely manner, to the beam that meets the condition, avoiding service interruption of the terminal.

In a possible design, the first measurement report sent by the terminal may further include the signal quality of the first cell to which the first beam group belongs. Specifically, a manner of determining the signal quality of the first cell may include: the terminal determines the signal quality of the first cell based on signal quality of a maximum of M beams having highest signal quality in the first cell; or the terminal determines the signal quality of the first cell based on signal quality of a beam whose signal quality is higher than a first preset threshold in the first cell.

When signal quality of each beam in the first cell is below the first preset threshold, in a current technology, the terminal sets the signal quality of the first cell to a smallest value. However, the signal quality of the first cell cannot be truly reflected in this manner, resulting in a relatively large error when the network device compares signal quality of cells. Consequently, the network device performs inaccurate mobility control, causing service interruption of the terminal.

In a possible design, when the signal quality of each beam in the first cell is below the first preset threshold, in an optional implementation, the terminal may determine the signal quality of the first cell based on signal quality of X beams whose signal quality has a smallest difference from the first preset threshold, so as to accurately reflect the signal quality of the first cell, assist the network device in performing accurate mobility control, and avoid service interruption of the terminal. X may be configured by the network device or may be predefined, and a value of X is an integer greater than 0.

Alternatively, when the signal quality of each beam in the first cell is below the first preset threshold, in another optional implementation, the terminal may determine the signal quality of the first cell based on signal quality of Y beams that have a difference less than a second preset threshold from signal quality of a target beam, where the target beam is a beam whose signal quality has a smallest difference from the first preset threshold.

In a possible design, the terminal may determine the signal quality of the first cell based on an offset, where the offset is determined based on a first quantity.

In a possible design, the terminal receives first indication information sent by the network device; and the terminal sends the first measurement report, where the first measurement report includes the identification information and the signal quality of the beams in the first beam group, or the first measurement report includes the quantity of the beams in the first beam group, or the first measurement report includes the identification information of the beams in the first beam group.

In this embodiment of this application, the terminal reports measurement information of beam(s) based on a network configuration, so that the network device may make a handover decision more accurately.

According to a second aspect, this application provides another communication method, including: obtaining signal quality of each beam in a first cell; and when the signal quality of each beam in the first cell is below a first preset threshold, determining signal quality of the first cell based on signal quality of X beams whose signal quality has a smallest difference from the first preset threshold, where the X beams belong to the first cell, and X is an integer greater than 0, or determining signal quality of the first cell based on signal quality of Y beams that have a difference less than a second preset threshold from signal quality of a target beam, where the target beam belongs to the first cell and is a beam whose signal quality has a smallest difference from the first preset threshold, the Y beams belong to the first cell, and Y is an integer greater than 0.

In this application, a terminal may determine the signal quality of the first cell based on the signal quality of the X beams whose signal quality has the smallest difference from the first preset threshold, so as to accurately reflect the signal quality of the first cell, assist a network device in performing accurate mobility control, and avoid service interruption of the terminal.

According to a third aspect, this application provides another communication method, including: receiving, by a network device, a first measurement report sent by a terminal, where the first measurement report is sent by the terminal when the terminal determines that information about a first beam group, which meets a condition for reporting a measurement report, in a first cell is different from information about beams in the first cell that is included in a previous measurement report. The first measurement report includes identification information of beams in the first beam group and signal quality of the beams in the first beam group, or the first measurement report includes a quantity of beams in the first beam group, or the first measurement report includes identification information of beams in the first beam group.

In another possible design, the network device receives initial signal quality of the first cell and a first quantity of beams that are used to determine signal quality of the first cell.

The network device determines the signal quality of the first cell with reference to the initial signal quality of the first cell and an offset, where the offset is determined based on the first quantity.

In another possible design, the network device sends first indication information to the terminal, where the first indication information is used to indicate that the first measurement report to be reported by the terminal includes the identification information and the signal quality of the beams in the first beam group, or the first indication information is used to indicate that the first measurement report includes the quantity of the beams in the first beam group, or the first indication information is used to indicate that the first measurement report includes the identification information of the beams in the first beam group.

In another possible design, the network device sends second indication information to the terminal, where the second indication information is used to indicate a maximum quantity of pieces of identification information that is included in the first measurement report to be reported by the terminal and/or a maximum quantity of signal quality values of beams that is included in the first measurement report.

According to a fourth aspect, this application provides a terminal, and the terminal includes a module or a unit configured to perform the communication method according to the first aspect or the second aspect.

According to a fifth aspect, this application provides another terminal, and the terminal includes a processor, a communications module, and a memory. The memory is configured to store instruction(s). The processor is configured to read the instruction(s) in the memory to perform the communication method according to the first aspect or the second aspect.

According to a sixth aspect, this application provides a network device, and the network device includes a module or a unit configured to perform the communication method according to the third aspect.

According to a seventh aspect, this application provides another network device, and the network device includes a processor, a communications module, and a memory. The memory is configured to store instruction(s). The processor is configured to read the instruction(s) in the memory to perform the communication method according to the third aspect.

According to an eighth aspect, this application provides a communications system, including a terminal and a network device, where the terminal is the terminal described in the fourth aspect or the fifth aspect, and the network device is the network device described in the third aspect.

According to a ninth aspect, this application provides a computer storage medium, configured to store computer software instruction(s) used by the foregoing terminal, and the computer software instruction(s) includes a program designed to perform the foregoing aspects.

According to a tenth aspect, this application provides another computer storage medium, configured to store a computer software instruction(s) used by the foregoing terminal, and the computer software instruction(s) includes a program designed to perform the foregoing aspects.

Beneficial effects of implementing the embodiments of this application are as follows.

When the terminal obtains through measurement that information about a beam that meets a condition is different from information about a beam in a previous measurement report, the terminal may report the measured information about the beam to the network device, so as to assist the network device in configuring the beam for the terminal and avoid service interruption of the terminal.

DETAILED DESCRIPTION OF ILLUSTRATIVE EMBODIMENTS

Figure 1:
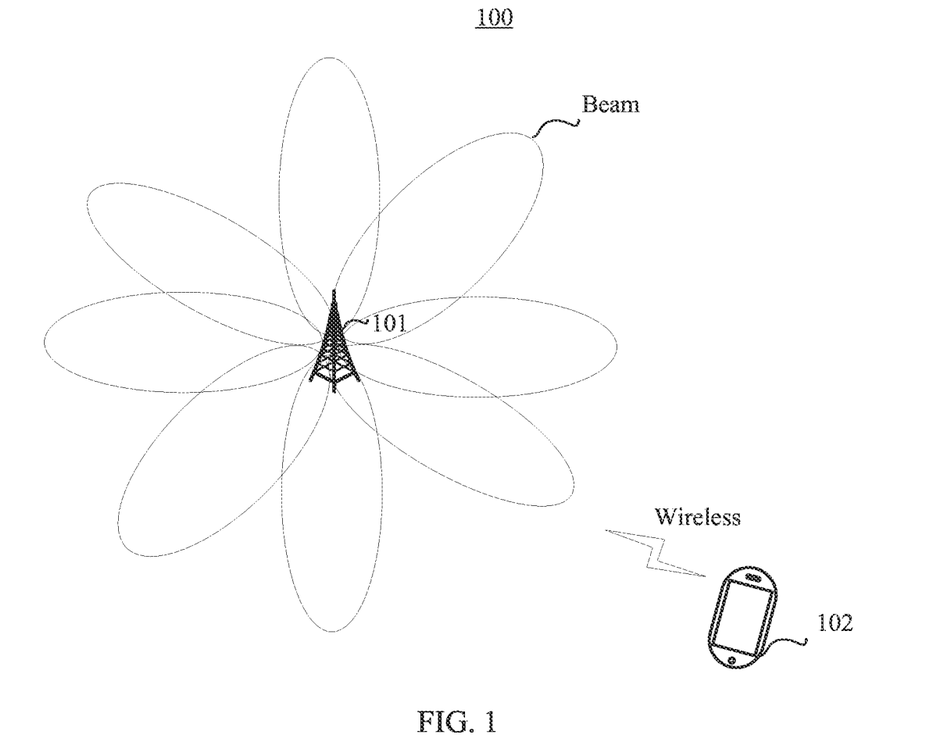
FIG. 1 is a schematic architectural diagram of a communications system according to an embodiment of this application.

Referring to FIG. 1, FIG. 1 is a schematic architectural diagram of a communications system in an embodiment of this application. The communications system 100 includes a network device 101 and a terminal 102.

The network device 101 may be a network device using a new radio (NR) technology, may be a NodeB (NB) in a 3G (for example, universal mobile telecommunications system (UMTS), Wideband Code Division Multiple Access (WCDMA), and Time Division-Synchronous Code Division Multiple Access (TD-SCDMA) system, or may be an evolved NodeB (eNB) in a Long Term Evolution (LTE) system. In addition, in this embodiment of this application, the network device 101 may further control a gain value for a direction (or a channel) of each transmit antenna that is configured as an array antenna to form a plurality of beams. The network device 101 communicates with the terminal 102 by using a beam. Moreover, the network device 101 may have other names in an NR system, which include but are not limited to: base station (BS), evolved base station, and the like.

The terminal 102 may be referred to as a mobile station, an access terminal, a subscriber unit, a subscriber station, a remote station, a remote terminal, a mobile device, a user terminal, a terminal, a wireless communications device, a user agent, a user apparatus, or other user equipment. The terminal 102 may further be a cellular phone, a personal digital assistant (PDA), a handheld device having a wireless communications function, an in-vehicle device, a wearable device, a mobile station in a future 5G network, a terminal device in a future evolved public land mobile network (PLMN) network, or the like. In this embodiment of this application, the terminal 102 may measure a signal that is sent by the network device 101 by using a beam and report a measurement result to the network device 101 to assist the network device 101 in making a handover decision.

In an application scenario of this application, the network device 101 sends a reference signal and/or a synchronization signal (SS) to the terminal 102 based on a beam. The reference signal may be a channel state information-reference signal (CSI-RS) or the like. The terminal 102 measures a reference signal and/or a synchronization signal for a serving cell, an intra-frequency neighboring cell, an inter-frequency neighboring cell, or an inter-RAT neighboring cell, and reports a measurement result to the network device 101, so that the network device 101 configures a beam or a cell that has highest signal quality for the terminal 102.

Embodiment 1

Figure 2:
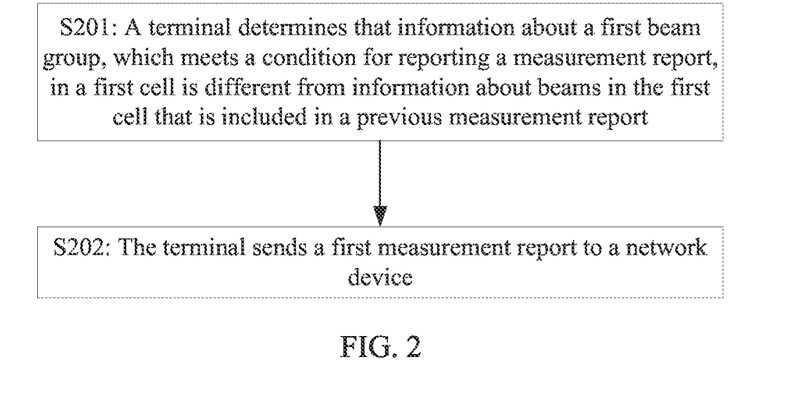
FIG. 2 is a schematic flowchart of a communication method according to an embodiment of this application.

Referring to FIG. 2, this embodiment of this application provides a schematic flowchart of a communication method. The method includes but is not limited to the following steps.

S201: A terminal determines that information about a first beam group, which meets a condition for reporting a measurement report, in a first cell is different from information about beams in the first cell that is included in a previous measurement report.

It may be understood that the measurement report may include information about a plurality of beam groups, and each beam group corresponds to a cell. The first beam group herein belongs to a cell, for example, the first cell. Then the terminal compares the information about the first beam group in the first cell with the information about the beams in the first cell that is in the previous measurement report.

In this embodiment of this application, the first beam group may include at least one beam. The information about the first beam group may include identification information of beams in the first beam group and/or a quantity of beams in the first beam group.

Step S201 may be as follows: the terminal determines that the identification information of the beams in the first beam group, which meets the condition for reporting a measurement report, in the first cell is different from identification information of the beams in the first cell that is included in the previous measurement report; or the terminal determines that the quantity of the beams in the first beam group, which meets the condition for reporting a measurement report, in the first cell is different from a quantity of beams in the first cell that is included in the previous measurement report; or the terminal determines that the identification information of the beams in the first beam group, which meets the condition for reporting a measurement report, in the first cell is different from identification information of beams in the first cell that is included in the previous measurement report, and the quantity of the beams in the first beam group is different from a quantity of beams in the first cell that is included in the previous measurement report. "Different" herein includes "not identical" or "completely different."

For example, that the identification information of the beams in the first beam group is different from the identification information of the beams that is included in the previous measurement report means that the identification information of the beams in the first beam group is not identical with the identification information of the beams that is included in the previous measurement report. For example, it is assumed that the identification information of the beams that is included in the previous measurement report is beam1-1, beam1-2, and beam1-3, and the terminal determines that the identification information of the beams in the first beam group that meets the condition for reporting a measurement report is beam1-1, beam1-2, and beam1-4.

Identification information beam1-4 of a beam in the first beam group has no same corresponding identification information in the previous measurement report. In this case, the terminal determines that the identification information of the beams in the first beam group that meets the condition for reporting a measurement report is different from the identification information of the beams that is included in the previous measurement report. Alternatively, the identification information of the beams that is included in the previous measurement report is beam1-1, beam1-2, and beam1-3, and the terminal determines that the identification information of the beams in the first beam group that meets the condition for reporting a measurement report is beam1-1 and beam1-2. The identification information beam1-3 of a beam in the previous measurement report has no same corresponding identification information in the identification information of the beams in the first beam group. In this case, the terminal determines that the identification information of the beams in the first beam group that meets the condition for reporting a measurement report is different from the identification information of the beams that is included in the previous measurement report. Alternatively, the identification information of the beams that is included in the previous measurement report is beam1-1, beam1-2, and beam1-3, and the terminal determines that the identification information of the beams in the first beam group that meets the condition for reporting a measurement report is beam1-4, beam1-5, and beam1-6. None of the identification information of the beams in the first beam group has same corresponding identification information in the previous measurement report. In this case, the terminal determines that the identification information of the beams in the first beam group that meets the condition for reporting a measurement report is different from the identification information of the beams that is included in the previous measurement report.

Identification information of a beam may include a beam identifier, an antenna port identifier of the beam, a reference signal of the beam, an index of the beam, or the like, and is used to uniquely identify the beam. In this embodiment of this application, a beam may be indicated by a plurality of combinations of letters, digits, or symbols, for example, beam1-1, beam1-2, or beam1-3.

Figure 3:
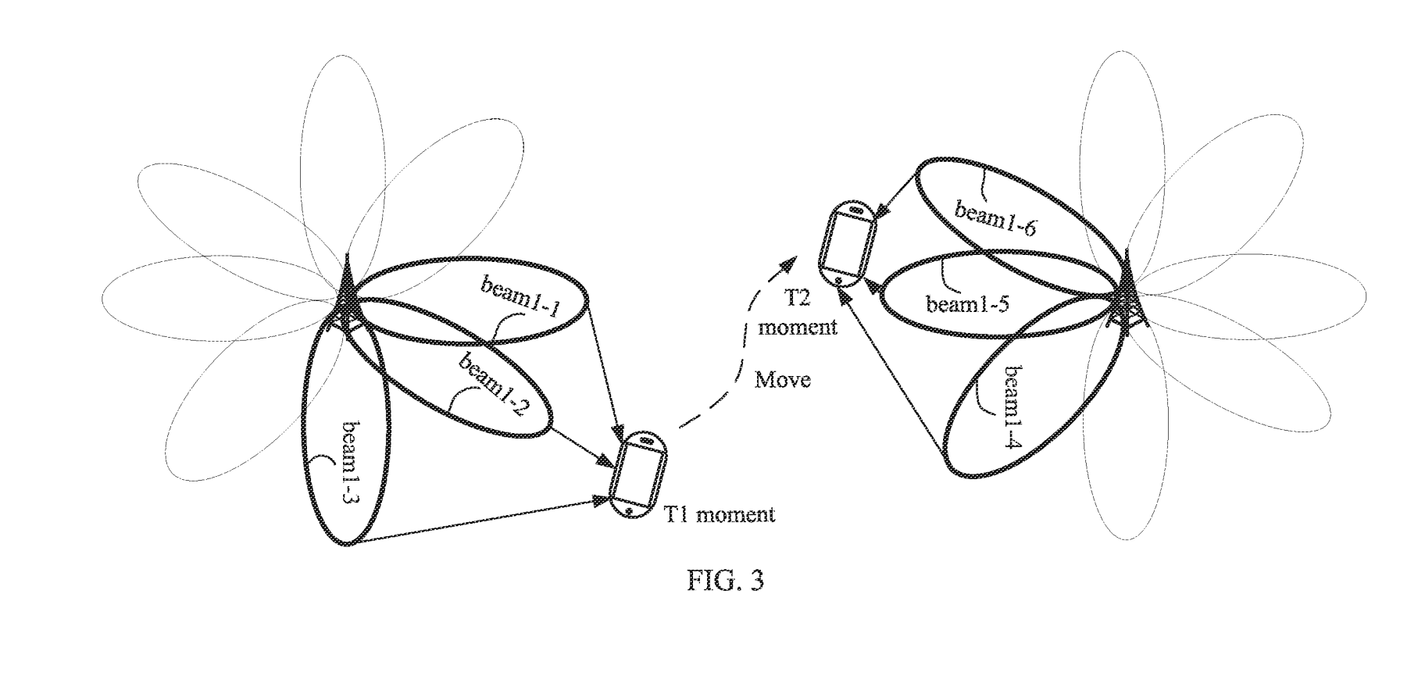
FIG. 3 is a schematic architectural diagram of another communications system according to an embodiment of this application.

Referring to FIG. 3, FIG. 3 is a schematic architectural diagram of another communications system according to this embodiment of this application. As shown in FIG. 3, the measurement report to be reported by the terminal at a moment T1 includes information about a total of three beams: beam1-1, beam1-2, and beam1-3. As the terminal is moving, the terminal obtains through measurement at a moment T2 that the beams that meet the condition for reporting a measurement report are a total of three beams: beam1-4, beam1-5, and beam1-6. The terminal may determine that the identification information of the beams that are measured at the moment T2 and meet the condition for reporting a measurement report is different from the identification information of the beams that is included in the measurement report at the moment T1. It should be noted that the beams beam1-1, beam1-2, beam1-3, beam1-4, beam1-5, and beam1-6 belong to a same cell, and two base stations in FIG. 3 are a same base station and are merely location examples at different moments.

It may be understood that the condition for reporting a measurement report herein may be configured by a network device. The condition for reporting a measurement report may include a quality threshold, hysteresis, and the like, for example, signal quality of a beam is higher than the quality threshold.

S202: The terminal sends a first measurement report to a network device, where the first measurement report includes identification information of beams in the first beam group and signal quality of the beams in the first beam group, or the first measurement report includes a quantity of beams in the first beam group, or the first measurement report includes identification information of beams in the first beam group.

By implementing this embodiment of this application, when the terminal obtains through measurement that information about a beam that meets the condition for reporting a measurement report is different from information about a beam in the previous measurement report, the terminal may report the measured information about the beam to the network device, so that the terminal is handed over, in a timely manner, to the beam that meets the condition, avoiding service interruption of the terminal. With reference to FIG. 3, when the terminal obtains through measurement that information about the beams that meet the condition at the T2 moment is different from information about the beams that is included in the measurement report at the moment T1, the terminal may send the information about the beams beam1-4, beam1-5, and beam1-6 measured at the moment T2 to the network device to assist the network device in making a handover decision, thereby preventing the network device from selecting a beam still from beams in the beam information beam1-1, beam1-2, and beam1-3 reported at the moment T1 and configuring the beam for the terminal, and avoiding service interruption of the terminal.

It may be understood that the first measurement report sent by the terminal may further include signal quality of the first cell to which the first beam group belongs. For a specific manner of determining the signal quality of the first cell, refer to descriptions in the following Embodiment 2.

It should be noted that if the first measurement report includes only identifiers or the quantity of the beams in the first beam group, the handover decision may be made further with reference to the previously reported signal quality of the first cell or the currently reported signal quality of the first cell. A specific handover decision may be made with reference to related descriptions in the following embodiments or in another manner. This is not limited in this embodiment of this application.

Embodiment 2

This embodiment provides a method for determining signal quality of a cell. The method is applicable to any scenario in which signal quality of a cell needs to be determined.

Optionally, the method in Embodiment 2 may be independent of other embodiments or may be combined with Embodiment 1, Embodiment 3, or Embodiment 4.

Figure 4:
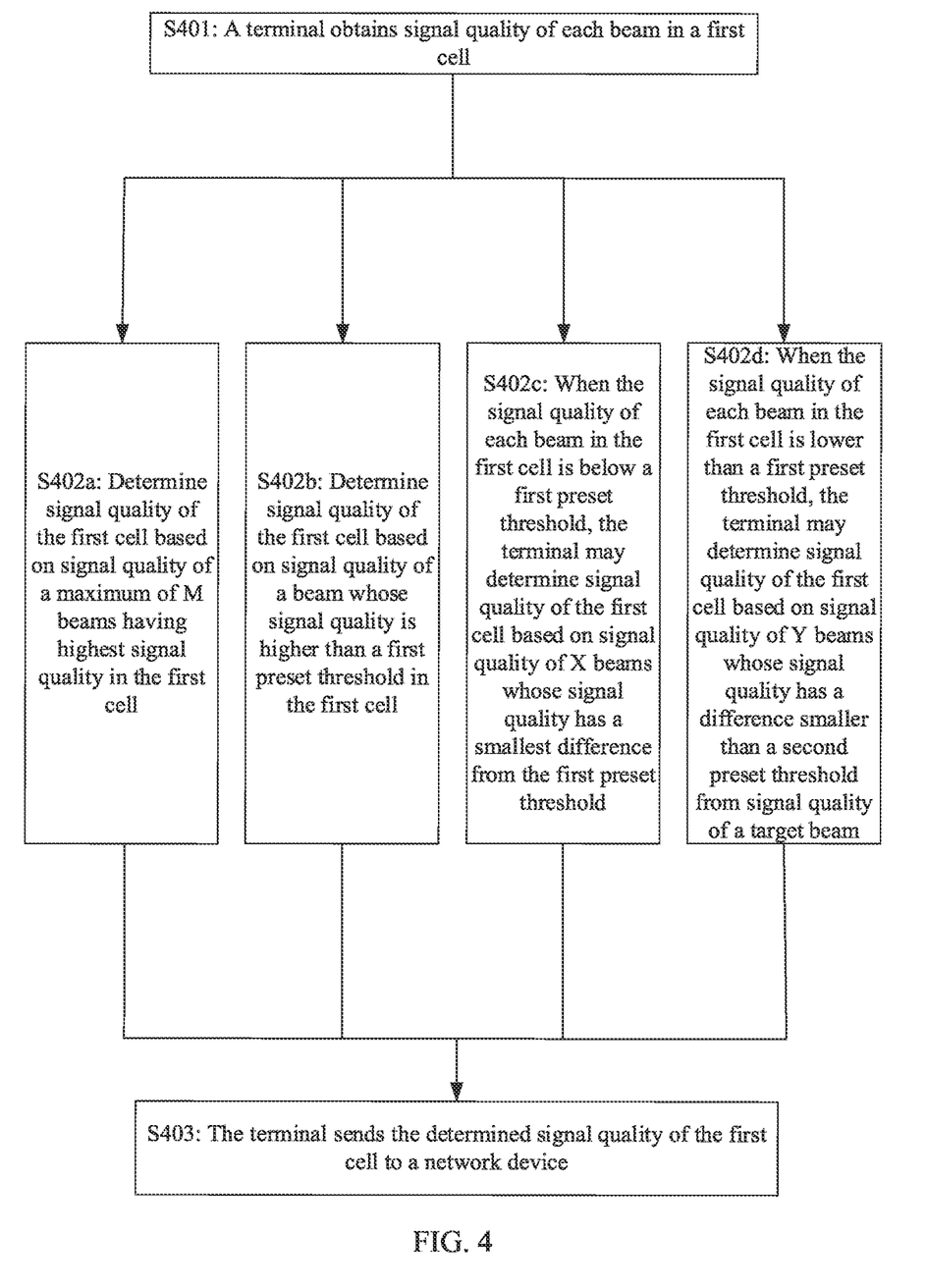
FIG. 4 is a schematic flowchart of another communication method according to an embodiment of this application.

As shown in FIG. 4, the method for determining signal quality of a cell may include the following steps.

S401: A terminal obtains signal quality of each beam in a first cell.

S402a: Determine signal quality of the first cell based on signal quality of a maximum of M beams having highest signal quality in the first cell.

M is a positive integer greater than or equal to 1, and M may be configured or predefined.

Optionally, the terminal may calculate an average value of signal quality of a maximum of the first M beams having a highest signal quality, and use the calculated average value as the signal quality of the cell.

For example, signal quality of beams beam1-4, beam1-5, and beam1-6 in a cell is respectively 2 dB, 12 dB, and 9 dB, and M is equal to 2. In this case, the terminal calculates an average value of signal quality of the first two beams beam1-5 and beam1-6 having highest signal quality as (12+9)/2=10.5 dB, and uses the average value 10.5 dB as the signal quality of the cell.

Optionally, the terminal may alternatively determine the signal quality of the first cell in the following manners.

S402b: Determine signal quality of the first cell based on signal quality of a beam whose signal quality is higher than a first preset threshold in the first cell. Optionally, the terminal may use an average value of signal quality of beams whose signal quality is higher than the first preset threshold as the signal quality of the cell. It may be understood that the first preset threshold herein may be configured by a network device or may be predefined. This is not limited in this embodiment of this application.

For example, signal quality of beams beam1-4, beam1-5, and beam1-6 in the first cell is respectively 2 dB, 12 dB, and 9 dB, and the first preset threshold is 5 dB. In this case, the terminal calculates an average value of the signal quality of the beams beam1-5 and beam1-6 whose signal quality is higher than the first preset threshold 5 dB as (12+9)/2=10.5 dB, and uses the average value 10.5 dB as the signal quality of the first cell.

When the signal quality of each beam in the first cell is below the first preset threshold, in a current technology, the terminal sets the signal quality of the first cell to a smallest value. However, the signal quality of the first cell cannot be truly reflected in this manner, resulting in a relatively large error when the network device compares signal quality of cells. Consequently, the network device performs inaccurate mobility control, causing service interruption of the terminal.

S402c: When the signal quality of each beam in the first cell is below a first preset threshold, the terminal may determine signal quality of the first cell based on signal quality of X beams whose signal quality has a smallest difference from the first preset threshold, so as to accurately reflect the signal quality of the first cell, assist a network device in performing accurate mobility control, and avoid service interruption of the terminal. X may be configured by the network device or may be predefined, and a value of X is an integer greater than 0.

For example, signal quality of beams beam1-4, beam1-5, and beam1-6 in the first cell is respectively 2 dB, 12 dB, and 9 dB, the first preset threshold is 15 dB, and the signal quality of each beam in the first cell is below 15 dB. When X is equal to 1, the terminal may use the signal quality 12 dB of the beam that has a smallest difference from the first preset threshold 15 dB as the signal quality of the first cell.

S402d: When the signal quality of each beam in the first cell is below a first preset threshold, the terminal may determine signal quality of the first cell based on signal quality of Y beams that have a difference less than a second preset threshold from signal quality of a target beam, where the target beam is a beam whose signal quality has a smallest difference from the first preset threshold. Y may be configured by a network device or may be predefined, and a value of Y is an integer greater than 0. The target beam may be determined based on a particular condition. For example, a beam having highest signal quality is used as the target beam.

For example, signal quality of beams beam1-4, beam1-5, and beam1-6 in the first cell is respectively 2 dB, 12 dB, and 9 dB, the first preset threshold is 15 dB, and the second preset threshold is 4 dB. It may be learned that the signal quality of each beam in the first cell is below 15 dB. The beam beam1-5 having highest signal quality in the first cell may be set as the target beam. In this case, the terminal may determine the signal quality of the cell based on the signal quality 12 dB and 9 dB of the beams that have a difference less than the second preset threshold 4 dB from signal quality of the target beam beam1-5.

Optionally, the terminal may obtain an average value of the signal quality of the beams that have a difference less than the second preset threshold from the signal quality of the target beam, and use the average value as the signal quality of the cell.

The foregoing example is still used. The terminal determines that the signal quality of the beams that have a difference less than the second preset threshold 4 dB from the signal quality of the target beam beam1-5 is 12 dB and 9 dB. In this case, the terminal may obtain an average value of the signal quality 12 dB and 9 dB, that is, (12+9)/2=10.5 dB, and use the average value 10.5 dB as the signal quality of the cell.

In this embodiment of this application, the signal quality of the cell is accurately reflected as much as possible by using a rollback mechanism, to prevent the network device from making an inaccurate mobility judgment.

S403: The terminal sends the determined signal quality of the first cell to a network device.

Embodiment 3

Still another embodiment of this application provides a communication method to improve robustness of a handover decision. The method is applicable to any scenario in which a handover decision is required.

Optionally, the method in Embodiment 3 may be independent of other embodiments or may be combined with Embodiment 1, Embodiment 2, or Embodiment 4.

Figure 5:
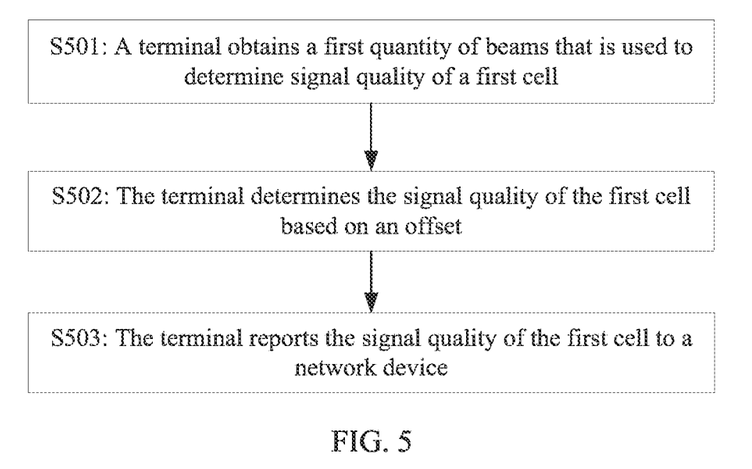
FIG. 5 is a schematic flowchart of another communication method according to an embodiment of this application.

As shown in FIG. 5, the communications method may include the following steps.

S501: A terminal obtains a first quantity of beams that are used to determine signal quality of a first cell.

S502: The terminal determines the signal quality of the first cell based on an offset, where the offset is determined based on the first quantity.

A particular correspondence exists between the first quantity and the offset. The correspondence may be configured by a network device for the terminal, negotiated between the network device and the terminal, or predefined in a communications protocol.

Optionally, the correspondence may be explicit or implicit.

Specifically, an explicit relationship means that a direct correspondence exists between the offset and the first quantity. For example, when the first quantity is less than 5, the offset is 1; when the first quantity is greater than or equal to 5, the offset is 2.

An implicit relationship means that a coefficient of basic measurement offset delta is determined based on the first quantity to further obtain the offset. The basic measurement offset delta may be configured by the network device for the terminal, negotiated between the network device and the terminal, or predefined in a communications protocol.

Optionally, the coefficient of delta may be the first quantity. For example, the basic measurement offset delta is configured by the network device, and the first quantity is 4. In this case, the coefficient of delta is 4, and the offset is 4×delta.

After the offset is obtained in the foregoing manner, the signal quality of the first cell directly obtained based on a beam may be adjusted.

For example, the signal quality of the first cell directly obtained based on a beam is 10.5 dB, the first quantity is 2, and the offset corresponding to the first quantity less than 5 is 2. In this case, the terminal determines that final signal quality of the cell is Q=10.5+2. Alternatively, the first quantity is 4, the basic measurement offset delta is 0.6, and the offset is 4×0.6. In this case, the terminal determines that final signal quality of the cell is Q=10.5+2.4.

S503: The terminal reports the signal quality of the first cell to a network device.

It should be noted that in this embodiment of this application, the terminal sends the finally determined signal quality of the cell to the network device. Optionally, adjustment on the signal quality of the cell may alternatively be implemented by the network device.

For example, S502 may not be performed, but when reporting the signal quality of the first cell to the network device in S503, the terminal may further report the first quantity to the network device, so that the network device may adjust the reported signal quality of the first cell according to a method similar to the method described in S502.

Optionally, some other parameters may also be adjusted at the terminal or the network device according to a method similar to the method described in S502 and S503. The foregoing parameters may include at least one of a signal quality threshold, hysteresis, time to trigger, and an offset for reporting. It may be understood that different parameters may have different basic offsets or different correspondences between the offset and the first quantity. Examples are not given one by one in this embodiment of this application.

In this embodiment of this application, robustness of a handover decision may be improved by adjusting the foregoing parameters with reference to the first quantity.

In each embodiment described above, the terminal may report signal quality of a beam and/or signal quality of a cell to the network device by using a measurement report.

Embodiment 4

This embodiment of this application provides a communication method. Optionally, the method in Embodiment 4 may be independent of other embodiments or may be combined with Embodiment 1, Embodiment 2, and Embodiment 3.

Figure 6:
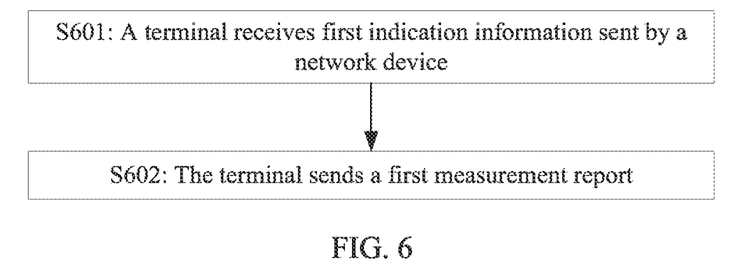
FIG. 6 is a schematic flowchart of another communication method according to an embodiment of this application.

As shown in FIG. 6, the method may include the following steps.

S601: A terminal receives first indication information sent by a network device.

The first indication information may be used to indicate that a measurement report to be reported by the terminal needs to carry measurement information of beam(s).

Optionally, the first indication information may be sent together with another reporting condition parameter or sent separately. The terminal may combine the first indication information with other reporting condition parameter(s) for use.

The measurement information of beam(s) includes but is not limited to: identification information of beam(s) and signal quality of the beam(s), or a quantity of beam(s), or identification information of beam(s).

For example, there are four beams that meet a condition for reporting a measurement report, identification information of the four beams is beam1-4, beam1-5, beam1-6, and beam1-7, and signal quality of the four beams is 2 dB, 12 dB, 9 dB, and 10 dB. The first indication information indicates that the measurement report needs to carry the identification information of the beams and the signal quality of the beams. In this case, the terminal sends the four pieces of identification information beam1-4, beam1-5, beam1-6, and beam1-7 and corresponding four signal quality values 2 dB, 12 dB, 9 dB, and 10 dB through the measurement report to the network device. Alternatively, the first indication information indicates that the measurement report needs to carry the quantity of the beams. In this case, the terminal sends the quantity 4 of beams that meet the condition for reporting a measurement report through the measurement report to the network device. Alternatively, the first indication information indicates that the measurement report needs to carry the identification information of the beams. In this case, the terminal sends the four pieces of identification information beam1-4, beam1-5, beam1-6, and beam1-7 to the network device.

Optionally, the terminal receives second indication information sent by the network device. The second indication information is used to indicate a maximum quantity Z of beams in a first beam group. For a meaning and a determining manner of the first beam group, refer to related descriptions in the foregoing embodiments. Details are not described herein again.

Optionally, the second indication information may be sent together with another reporting condition parameter and/or the first indication information, or sent separately. The terminal may combine the second indication information with other reporting condition parameter(s) and/or the first indication information for use.

A maximum quantity of beam identifiers carried by the terminal in the measurement report may be limited by using the second indication information. Z may be different from or the same as a quantity of beams that are used during measurement.

S602: The terminal sends a first measurement report, where the first measurement report includes identification information and signal quality of beams in a first beam group, or the first measurement report includes a quantity of beams in a first beam group, or the first measurement report includes identification information of beams in a first beam group.

In this embodiment of this application, the terminal reports the measurement information of beam(s) based on a network configuration, so that the network device may make a handover decision more accurately.

It may be understood that the communication method described in Embodiment 4 is applicable to any scenario in which a handover decision is required. Optionally, the method in Embodiment 4 may be independent of other embodiments or may be combined with other embodiments.

It may be understood that the terminal may perform some or all of the steps in the embodiment. These steps or operations are merely examples. In this embodiment of this application, other operations or variants of operations may be further performed.

Embodiment 5

This embodiment of this application provides a communication method. A network device receives a first measurement report sent by a terminal, where the first measurement report is sent by the terminal when the terminal determines that information about a first beam group, which meets a condition for reporting a measurement report, in a first cell is different from information about beams in the first cell that is included in a previous measurement report. The first measurement report includes identification information of beams in the first beam group and signal quality of the beams in the first beam group, or the first measurement report includes a quantity of beams in the first beam group, or the first measurement report includes identification information of beams in the first beam group.

In another possible design, the network device receives initial signal quality of the first cell and a first quantity of beams that are used to determine signal quality of the first cell. The network device determines the signal quality of the first cell with reference to the initial signal quality of the first cell and an offset, where the offset is determined based on the first quantity.

In another possible design, the network device sends first indication information to the terminal, where the first indication information is used to indicate that the first measurement report to be reported by the terminal includes the identification information and the signal quality of the beams in the first beam group, or the first indication information is used to indicate that the first measurement report includes the quantity of the beams in the first beam group, or the first indication information is used to indicate that the first measurement report includes the identification information of the beams in the first beam group.

In another possible design, the network device sends second indication information to the terminal, where the second indication information is used to indicate a maximum quantity of pieces of identification information that is included in the first measurement report to be reported by the terminal and/or a maximum quantity of signal quality values of beams that is included in the first measurement report.

In this embodiment of this application, for the method for determining the signal quality of the first cell by the network device based on the initial signal quality of the first cell and the offset, and meanings of the first measurement report, the first indication information, and the second indication information, refer to the foregoing Embodiment 1, Embodiment 3, and Embodiment 4. Details are not described herein again.

Embodiment 6

This embodiment of this application provides a terminal. The terminal may implement functions of the terminal in the methods described in the foregoing embodiments of this application.

Figure 7:
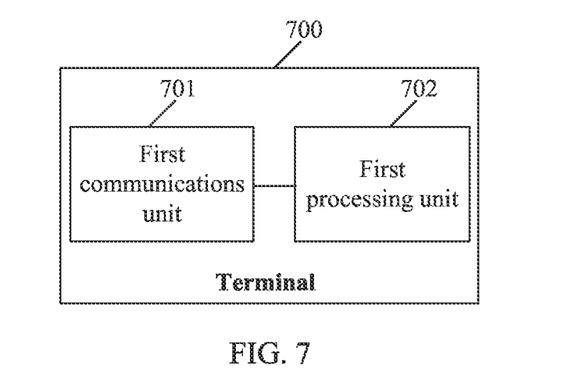
FIG. 7 is a schematic structural diagram of a terminal according to an embodiment of this application.

Optionally, as shown in FIG. 7, the terminal 700 may include a first communications unit 701 and a first processing unit 702.

The first processing unit 702 is configured to determine that information about a first beam group, which meets a condition for reporting a measurement report, in a first cell is different from information about beams in the first cell that is included in a previous measurement report.

The first communications unit 701 is configured to send a first measurement report, where the first measurement report includes identification information and signal quality of beams in the first beam group, or the first measurement report includes a quantity of beams in the first beam group, or the first measurement report includes identification information of beams in the first beam group.

Optionally, the first communications unit 701 is further configured to receive first indication information and/or second indication information sent by a network device.

It should be noted that, for functions and implementations of functional units of the terminal 700 described in this embodiment of this application, and meanings and obtaining manners of related parameters, refer to related descriptions of the corresponding terminal in the foregoing Embodiment 1. Details are not described herein again.

Figure 8:
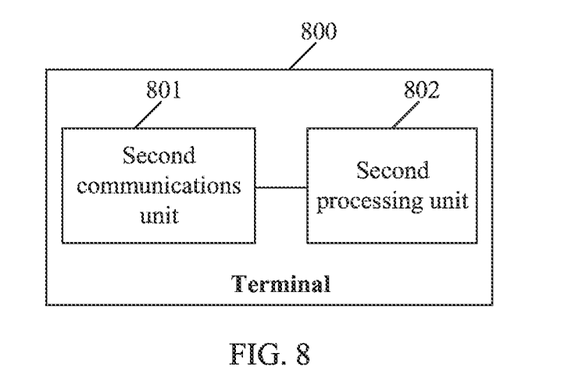
FIG. 8 is a schematic structural diagram of another terminal according to an embodiment of this application.

Optionally, this embodiment of this application provides another terminal. As shown in FIG. 8, the terminal 800 may include: a second communications unit 801 and a second processing unit 802.

The second communications unit 801 is configured to obtain signal quality of each beam in a first cell.

The second processing unit 802 is configured to determine signal quality of the first cell based on signal quality of a maximum of M beams having highest signal quality among the signal quality that is of the beams in the first cell and that is obtained by the second communications unit 801.

Alternatively, the second processing unit 802 is further configured to: when the signal quality of each beam in the first cell is below a first preset threshold, determine the signal quality of the first cell based on signal quality of X beams whose signal quality has a smallest difference from the first preset threshold among the signal quality that is of the beams in the first cell and that is obtained by the second communications unit 801.

Alternatively, the second processing unit 802 is further configured to: when the signal quality of each beam in the first cell is below a first preset threshold, determine the signal quality of the first cell based on signal quality of Y beams that have a difference less than a second preset threshold from signal quality of a target beam.

It should be noted that, for functions and implementations of functional units of the terminal 800 described in this embodiment of this application, and meanings and obtaining manners of related parameters, refer to related descriptions of the corresponding terminal in the foregoing Embodiment 2. Details are not described herein again.

Figure 9:
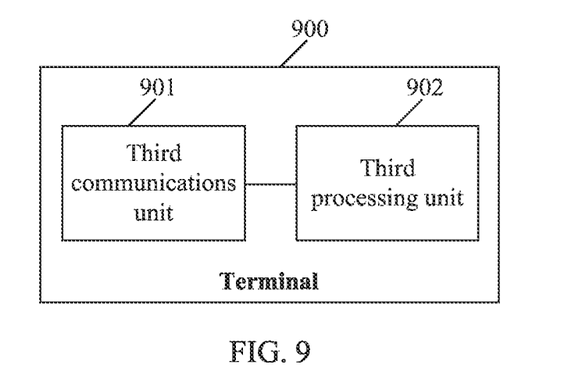
FIG. 9 is a schematic structural diagram of another terminal according to an embodiment of this application.

Optionally, this embodiment of this application provides another terminal. As shown in FIG. 9, the terminal 900 may include: a third communications unit 901 and a third processing unit 902.

The third communications unit 901 is configured to obtain a first quantity of beams that are used to determine signal quality of a first cell.

The third processing unit 902 is configured to determine the signal quality of the first cell based on an offset, where the offset is determined based on the first quantity obtained by the third communications unit 901.

The third communications unit 901 is further configured to report the signal quality of the first cell determined by the third processing unit 902 to a network device.

It should be noted that, for functions and implementations of functional units of the terminal 900 described in this embodiment of this application, and meanings and obtaining manners of related parameters, refer to related descriptions of the corresponding terminal in the foregoing Embodiment 3. Details are not described herein again.

Figure 10:
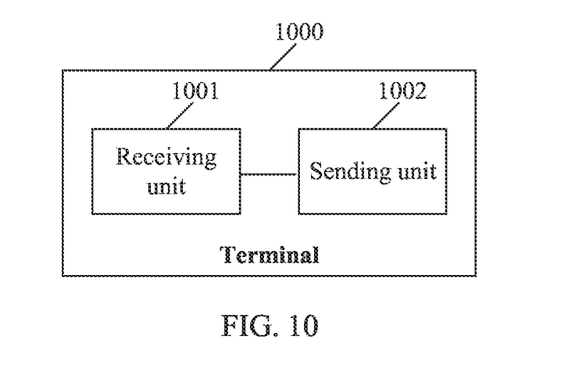
FIG. 10 is a schematic structural diagram of another terminal according to an embodiment of this application.

Optionally, this embodiment of this application provides another terminal. As shown in FIG. 10, the terminal 1000 may include: a receiving unit 1001 and a sending unit 1002.

The receiving unit 1001 is configured to receive first indication information sent by a network device. The sending unit 1002 is configured to send a first measurement report based on the first indication information. For details about how the first measurement report is sent based on the first indication information, refer to Embodiment 4. Details are not described herein again.

It should be noted that, for functions of functional units of the terminal 1000 described in this embodiment of this application, refer to related descriptions of the corresponding terminal in the foregoing Embodiment 4. Details are not described herein again.

It may be understood that, as described in the method embodiments, Embodiment 1 to Embodiment 4 may be independently implemented or combined, and functions that may be included in a communications unit or a processing unit of the terminal in this embodiment of this application may also be combined. For example, the first communications unit 701 may also implement functions of one or more units of the second communications unit, the third communications unit, the receiving unit, and the sending unit, and the first processing unit may also implement functions of the second processing unit and the third processing unit; or the second communications unit may also implement functions of one or more units of the first communications unit, the third communications unit, the receiving unit, and the sending unit; and so on. Examples are not given one by one in this embodiment of this application.

Embodiment 7

Figure 11:
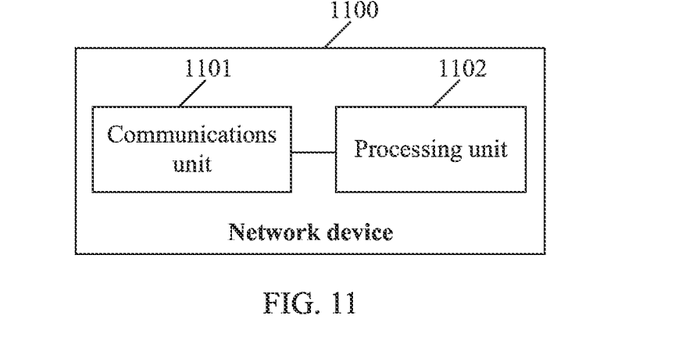
FIG. 11 is a schematic structural diagram of a network device according to an embodiment of this application.

This embodiment of this application provides a network device. The network device 1100 may implement functions of the network device in the methods described in the foregoing embodiments of this application.

As shown in FIG. 11, the network device may include: a communications unit 1101 and a processing unit 1102.

The communications unit 1101 is configured to receive a first measurement report sent by a terminal, where the first measurement report is sent by the terminal when the terminal determines that information about a first beam group, which meets a condition for reporting a measurement report, in a first cell is different from information about beams in the first cell that is included in a previous measurement report. The first measurement report includes identification information of beams in the first beam group and signal quality of the beams in the first beam group, or the first measurement report includes a quantity of beams in the first beam group, or the first measurement report includes identification information of beams in the first beam group.

Optionally, the communications unit 1101 is further configured to receive initial signal quality of the first cell and a first quantity of beams that are used to determine signal quality of the first cell.

The processing unit 1102 is configured to determine the signal quality of the first cell with reference to the initial signal quality of the first cell and an offset, where the offset is determined based on the first quantity.

Optionally, the communications unit 1101 is further configured to send first indication information to the terminal, where the first indication information is used to indicate that the first measurement report to be reported by the terminal includes the identification information and the signal quality of the beams in the first beam group, or the first indication information is used to indicate that the first measurement report includes the quantity of the beams in the first beam group, or the first indication information is used to indicate that the first measurement report includes the identification information of the beams in the first beam group.

Optionally, the communications unit 1101 is further configured to send second indication information to the terminal, where the second indication information is used to indicate a maximum quantity of pieces of identification information that is included in the first measurement report to be reported by the terminal and/or a maximum quantity of signal quality values of beams that is included in the first measurement report.

It should be noted that, for functions of functional units of the network device 1100 described in this embodiment of this application, refer to related descriptions of the corresponding network device in the foregoing Embodiment 5. Details are not described herein again.

Figure 12:
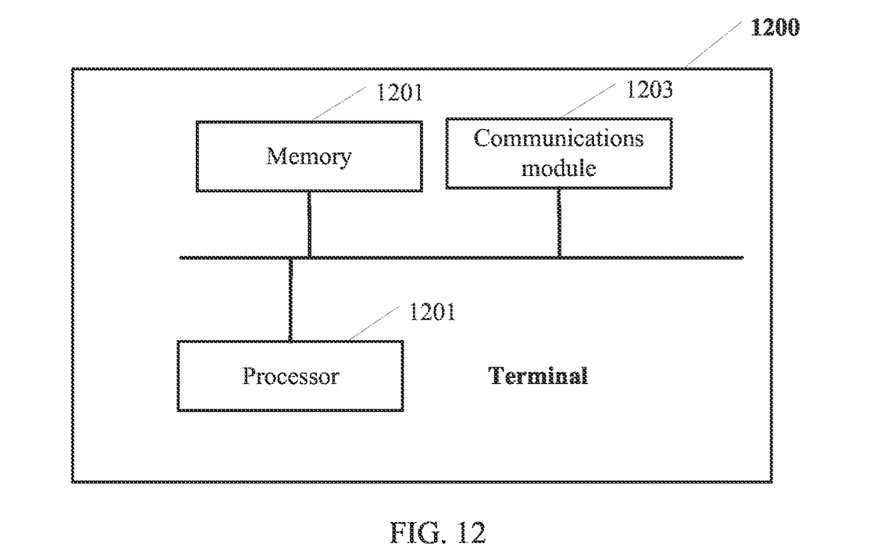
FIG. 12 is a schematic structural diagram of another terminal according to an embodiment of this application.

FIG. 12 shows a terminal 1200 according to another embodiment of this application. The terminal 1200 includes a processor 1201, a memory 1202, and a communications module 1203.

The memory 1202 includes but is not limited to a random access memory (RAM for short), a read-only memory (ROM for short), or an erasable programmable read only memory (EPROM for short). The memory 1202 is configured to store related program code and related data.

The processor 1201 may be one or more central processing units (CPU for short). When the processor 1201 is one CPU, the CPU may be a single-core CPU, or may be a multi-core CPU.

In a first implementation, the processor 1201 in the terminal 1200 reads the program code stored in the memory 1202 to perform the following operations:

The processor 1201 is configured to determine that information about a first beam group, which meets a condition for reporting a measurement report, in a first cell is different from information about beams in the first cell that is included in a previous measurement report.

The communications module 1203 is configured to send a first measurement report, where the first measurement report includes identification information and signal quality of beams in the first beam group, or the first measurement report includes a quantity of beams in the first beam group, or the first measurement report includes identification information of beams in the first beam group.

The processor 1201 is specifically configured to: determine that the identification information of the beams in the first beam group, which meets the condition for reporting a measurement report, in the first cell is different from identification information of the beams in the first cell that is included in the previous measurement report; and/or determine that the quantity of the beams in the first beam group, which meets the condition for reporting a measurement report, in the first cell is different from a quantity of beams in the first cell that is included in the previous measurement report.

The identification information of the beam includes at least one of: a beam identifier, antenna port identifier of the beam, a reference signal of the beam, and a beam index.

The first measurement report may further include the signal quality of the first cell.

The processor 1201 is further configured to determine the signal quality of the first cell based on an offset, where the offset corresponds to a quantity of beams that are used to determine the signal quality of the first cell.

The condition for reporting a measurement report includes a reporting parameter related to the quantity of the beams that are used to determine the signal quality of the first cell, where the reporting parameter includes at least one of a signal quality threshold, hysteresis, time to trigger, and an offset for reporting.

The communications module 1203 is further configured to receive first indication information sent by a network device, where the first indication information is used to indicate that the first measurement report includes the identification information and the signal quality of the beams in the first beam group, or the first indication information is used to indicate that the first measurement report includes the quantity of the beams in the first beam group, or the first indication information is used to indicate that the first measurement report includes the identification information of the beams in the first beam group.

The communications module 1203 is further configured to receive second indication information sent by the network device, where the second indication information is used to indicate a maximum quantity of pieces of identification information that is included in the first measurement report and/or a maximum quantity of signal quality values of the beams that is included in the first measurement report.

In another implementation, the processor 1201 in the terminal 1200 reads the program code stored in the memory 1202 to perform the following operations:

The communications module 1203 is configured to obtain signal quality of each beam in a first cell.

The processor 1201 is configured to: when the signal quality of each beam in the first cell is below a first preset threshold, determine signal quality of the first cell based on signal quality of X beams whose signal quality has a smallest difference from the first preset threshold, where the X beams belong to the first cell, and X is an integer greater than 0, or determine signal quality of the first cell based on signal quality of Y beams that have a difference less than a second preset threshold from signal quality of a target beam, where the target beam belongs to the first cell and is a beam whose signal quality has a smallest difference from the first preset threshold, the Y beams belong to the first cell, and Y is an integer greater than 0.

It should be noted that, for functions of function modules in the terminal 1200, refer to related descriptions of the corresponding terminal in the embodiments shown in FIG. 2 to FIG. 6. Details are not described herein again. Optionally, the processor 1201 may be configured to implement functions of one or more units of the first processing unit, the second processing unit, and the third processing unit, and the communications module 1203 may be configured to implement functions of one or more units of the first communications unit, the second communications unit, the third communications unit, the receiving unit, and the sending unit. In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings, or direct couplings, or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The foregoing integrated unit may be implemented in a form of hardware, or may be implemented in a form of hardware in addition to a software functional unit.

Some of the foregoing software functions may be stored in a storage unit. The storage unit includes instructions used to enable a computer device (which may be a personal computer, a server, or a network device) or a processor to perform some of the steps of the methods described in the embodiments of this application. The storage unit includes: one or more memories, such as a read-only memory (ROM), a random access memory (RAM), and an electrically erasable programmable read-only memory (EEPROM). The storage unit may exist independently, or may be integrated with the processor.

It may be understood by persons skilled in the art that, for the purpose of convenient and brief description, division of the foregoing function modules is used as an example for illustration. In actual application, the foregoing functions can be allocated to different function modules and implemented based on a requirement, that is, an inner structure of an apparatus is divided into different function modules to implement all or some of the functions described above. For a detailed working process of the foregoing apparatus, refer to a corresponding process in the foregoing method embodiments, and details are not described herein again.

Persons of ordinary skill in the art may understand that serial numbers such as "first" and "second" in this application are used only for convenience of description and distinguishing and are not intended to limit the scope of the embodiments of this application.

Persons of ordinary skill in the art may understand that serial numbers of the foregoing processes do not mean execution sequences in the embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions described in the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Figure 13:
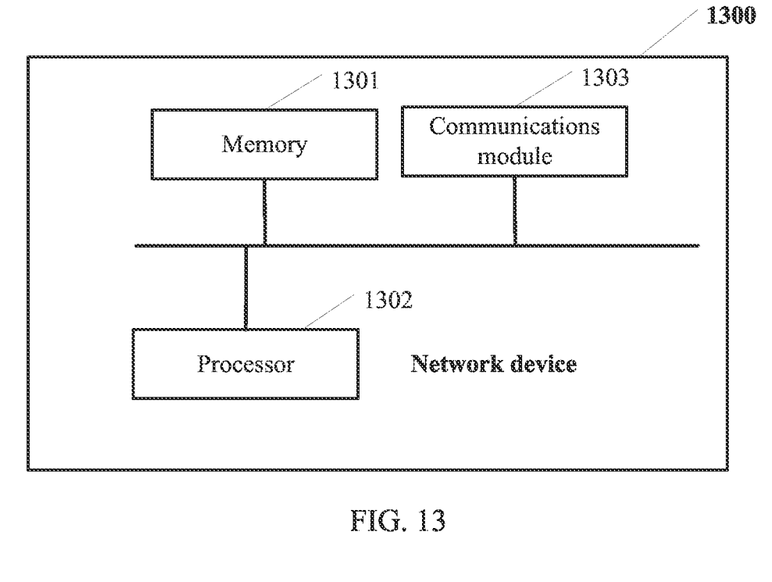
FIG. 13 is a schematic structural diagram of another network device according to an embodiment of this application.

FIG. 13 shows a network device 1300 according to another embodiment of this application. The network device 1300 includes a processor 1301, a memory 1302, and a communications module 1303.

The memory 1302 includes but is not limited to a random access memory RAM, a read-only memory ROM, or an erasable programmable read only memory EPROM. The memory 1302 is configured to store related program code and related data.

The processor 1301 may be one or more central processing units CPU. When the processor 1301 is one CPU, the CPU may be a single-core CPU, or may be a multi-core CPU.

In an implementation, the processor 1201 in the network device 1300 reads the program code stored in the memory 1202 to perform following operations:

The communications module 1303 is configured to receive first measurement report sent by a terminal, where the first measurement report is sent by the terminal when the terminal determines that information about a first beam group, which meets a condition for reporting a measurement report, in a first cell is different from information about beams in the first cell that is included in a previous measurement report. The first measurement report includes identification information of beams in the first beam group and signal quality of the beams in the first beam group, or the first measurement report includes a quantity of beams in the first beam group, or the first measurement report includes identification information of beams in the first beam group.

In another possible design, the communications module 1303 is configured to receive initial signal quality of the first cell and a first quantity of beams that are used to determine signal quality of the first cell.

The processor 1301 is configured to determine the signal quality of the first cell with reference to the initial signal quality of the first cell and an offset, where the offset is determined based on the first quantity.

The communications module 1303 is configured to send first indication information to the terminal, where the first indication information is used to indicate that the first measurement report to be reported by the terminal includes the identification information and the signal quality of the beams in the first beam group, or the first indication information is used to indicate that the first measurement report includes the quantity of the beams in the first beam group, or the first indication information is used to indicate that the first measurement report includes the identification information of the beams in the first beam group.

The communications module 1303 is configured to send second indication information to the terminal, where the second indication information is used to indicate a maximum quantity of pieces of identification information that is included in the first measurement report to be reported by the terminal and/or a maximum quantity of signal quality values of beams that is included in the first measurement report.

For this embodiment of this application, refer to related descriptions in Embodiment 5. Details are not described herein again.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A communication method, comprising:
   obtaining a first threshold to be used to derive a first signal quality of a cell, wherein the first threshold is configured by a network device;
   receiving indication information from the network device, wherein the indication information comprises first indication information indicating which beam measurement information needs to be reported;
   measuring a signal quality of each beam of at least one beam in the cell;
   deriving the first signal quality of the cell; and
   sending measurement information based on the indication information and information of the first signal quality of the cell to the network device;
   wherein deriving the first signal quality comprises:
   in a case that the at least one beam comprises one or more beams whose respective signal quality is above the first threshold, deriving the first signal quality of the cell based on an average value of the respective signal qualities of the one or more beams; and
   in a case that the respective signal quality of each beam of the at least one beam is below the first threshold, deriving the first signal quality of the cell based on a respective signal quality of a beam that has a highest signal quality in the at least one beam.

2. The method according to claim 1, wherein the beam that has the highest signal quality is a beam with a respective signal quality having a smallest difference from the first threshold in the at least one beam.

3. The method according to claim 1, wherein the cell comprises a serving cell or at least one neighboring cell of the serving cell.

4. The method according to claim 1, further comprising:
   performing adjustment on the first signal quality of the cell according to an offset to obtain a second signal quality of the cell, the offset being based on a quantity of beams that are used to determine the first signal quality of the cell.

5. The method according to claim 1, wherein the first signal quality of the cell enables the network device to use to perform mobility control.

6. The method according to claim 1, wherein the beam measurement information that needs to be reported comprises a beam identifier and a beam measurement result associated with the beam identifier.

7. The method according to claim 1, wherein the beam measurement information that needs to be reported comprises a beam identifier.

8. An apparatus, comprising at least one circuitry configured to:
   obtain a first threshold to be used to derive a first signal quality of a cell, wherein the first threshold is configured by a network device;
   receive indication information from the network device, wherein the indication information comprises first indication information indicating which beam measurement information needs to be reported;
   measure a signal quality of each beam of at least one beam in the cell;
   derive the first signal quality of the cell; and
   send measurement information based on the indication information and information of the first signal quality of the cell to the network device;

wherein deriving the first signal quality comprises:
- in a case that the at least one beam comprises one or more beams whose respective signal quality is above the first threshold, derive the first signal quality of the cell based on an average value of the respective signal qualities of the one or more beams; and
- in a case that the respective signal quality of each beam of the at least one beam is below the first threshold, derive the first signal quality of the cell based on a respective signal quality of a beam that has a highest signal quality in the at least one beam.

9. The apparatus according to claim 8, wherein the beam that has the highest signal quality is a beam with a respective signal quality having a smallest difference from the first threshold in the at least one beam.

10. The apparatus according to claim 8, wherein the cell comprises a serving cell or at least one neighboring cell of the serving cell.

11. The apparatus according to claim 8, wherein the at least one circuitry is further configured to:
- perform adjustment on the first signal quality of the cell according to an offset to obtain a second signal quality of the cell, the offset being based on a quantity of beams that are used to determine the first signal quality of the cell.

12. The apparatus according to claim 8, wherein the first signal quality of the cell enables the network device to perform mobility control.

13. The apparatus according to claim 8, wherein the beam measurement information that needs to be reported comprises a beam identifier and a beam measurement result associated with the beam identifier.

14. The apparatus according to claim 8, wherein the beam measurement information that needs to be reported comprises a beam identifier.

15. A communications method, comprising:
- configuring a first threshold for a terminal to be used to derive a first signal quality of a cell, and sending the first threshold to the terminal;
- sending indication information to the terminal, wherein the indication information comprises first indication information indicating which beam measurement information needs to be reported; and
- receiving measurement information and information of the first signal quality of the cell from the terminal, the measurement information being based on the indication information, the signal quality of the cell being based on the first threshold, and wherein,
  - in a case that there are one or more beams, in the cell, whose respective signal quality is above the first threshold, the signal quality of the cell is based on an average value of the respective signal qualities of the one or more beams, and
  - in a case that the respective signal quality of each beam of the one or more beams in the cell is below the first threshold, the signal quality of the cell is based on a respective signal quality of a beam that has a highest signal quality in the one or more beams of the cell.

16. The method according to claim 15, wherein the beam that has the highest signal quality is a beam with a respective signal quality having a smallest difference from the first threshold in the beam(s) of the cell.

17. The method according to claim 15, wherein the cell comprises a serving cell or at least one neighboring cell of the serving cell.

18. The method according to claim 15, further comprising:
- performing mobility control based on the signal quality of the cell.

19. The method according to claim 15, wherein the beam measurement information that needs to be reported comprises a beam identifier and a beam measurement result associated with the beam identifier.

20. The method according to claim 15, wherein the beam measurement information that needs to be reported comprises a beam identifier.

* * * * *

UNITED STATES PATENT AND TRADEMARK OFFICE
CERTIFICATE OF CORRECTION

| | | |
|---|---|---|
| PATENT NO. | : 12,262,238 B2 | Page 1 of 1 |
| APPLICATION NO. | : 18/160105 | |
| DATED | : March 25, 2025 | |
| INVENTOR(S) | : Geng et al. | |

It is certified that error appears in the above-identified patent and that said Letters Patent is hereby corrected as shown below:

In the Claims

In Column 20, in Claim 5, Line 44, after "device" delete "to use".

Signed and Sealed this
Sixth Day of May, 2025

Coke Morgan Stewart
*Acting Director of the United States Patent and Trademark Office*